United States Patent [19]
Dugdale et al.

[11] Patent Number: 6,003,995
[45] Date of Patent: Dec. 21, 1999

[54] ROTATING BACKSCREEN AND/OR PROJECTORS FOR OFF-AXIS LARGE FIELD OF VIEW DISPLAY

[75] Inventors: Jonathan L. Dugdale, Burleson, Tex.; James A. Turner, Binghamton, N.Y.

[73] Assignee: Raytheon Company, Lexington, Mass.

[21] Appl. No.: 08/741,064

[22] Filed: Oct. 30, 1996

[51] Int. Cl.⁶ .................................................. G03B 21/00
[52] U.S. Cl. ............................. 353/98; 353/46; 434/44; 348/36
[58] Field of Search .................................. 353/46, 48, 98; 348/121, 123, 747, 785, 786, 827, 39, 36; 434/43, 44, 38, 55; 359/449

[56] References Cited

U.S. PATENT DOCUMENTS

| | | | |
|---|---|---|---|
| 3,620,592 | 11/1971 | Freeman | 353/99 |
| 3,784,742 | 1/1974 | Burnham et al. | 434/43 |
| 3,785,715 | 1/1974 | Mecklenborg | 434/44 |
| 4,634,384 | 1/1987 | Neves et al. | 434/44 |
| 5,137,348 | 8/1992 | Lacroix | 353/122 |
| 5,253,116 | 10/1993 | Lacroix | 434/44 |
| 5,433,608 | 7/1995 | Murray | 434/44 |
| 5,566,370 | 10/1996 | Young | 434/44 |

*Primary Examiner*—William Dowling

[57] ABSTRACT

An off-axis backscreen visual display system with rotating backscreen and projector assembly. The system includes a full color projector for projecting the image beam, and a backscreen which redirects the image beam from the projector onto a collimating mirror. The mirror in turn reflects the beam toward the observer eye point. The backscreen and projector are mechanically integrated together to form an integrated assembly which is mounted for rotation about a pivot point. The collimating mirror is oversized relative to the nominal beam size so as to present mirror surface to the beam redirected by the backscreen through a range of rotation of the integrated assembly. An actuator system rotates the integrated assembly about the pivot point to obtain increase vertical field of view. The backscreen can alternatively be fixed in position, with only the projector assembly rotating. The projector can include electronic image positioning capabilities, so that the active area for the image is located in a lower projector area or in an upper projector area, to provide a virtual rotational capability.

18 Claims, 5 Drawing Sheets

WITH IMAGE IN UP FOV POSITION

WITH IMAGE IN DOWN FOV POSITION

ROTATING BACKSCREEN AND/OR PROJECTORS FOR OFF-AXIS LARGE FIELD OF VIEW DISPLAY

TECHNICAL FIELD OF THE INVENTION

This invention relates to display systems of the type utilized in simulator training systems.

BACKGROUND OF THE INVENTION

Off Axis Backscreen/Mirror Visual Display (OABD) systems are employed in simulator applications, e.g. simulators used for training pilots and other aircraft crew members. These systems typically have the drawback of a limited vertical field of view (FOV), usually about 40 degrees FOV. This limited FOV is often not enough to provide vision in areas necessary for multiple training tasks, such as the large downward FOV needed for landing training and large upward FOV needed for refueling training.

There is presently no known technique for obtaining a field of view larger than about 40 degrees in collimated visual displays such as the OABD system application. Although the use of a larger radius mirror might allow some increase in vertical FOV, mirror sizes much greater than those currently in use are just not practical due to several factors, including limitations in facility size, payload limitations (for systems on motion platforms), mirror manufacturing limitations, brightness impact, and cost.

Most OABD systems are also limited in resolution by both the projection device and the image generation system. Any increase in instantaneous vertical FOV negatively impacts the resolution of the system.

FIG. 1 shows one method used in the past few years whereby the entire display system is rotated about the observer eyepoint. This technique for increasing instantaneous vertical FOV is very complex because it requires moving structures, including mirrors, with a total system weight of almost 5,000 pounds in one application.

It would therefore be an advantage to provide an economical way to provide increased FOV for OABD systems.

A further advantage would be provided by an economical way to increase the total vertical FOV without impacting resolution.

Still another advantage would be provided by a system which increases the system resolution while maintaining the existing total FOV.

SUMMARY OF THE INVENTION

An off-axis backscreen visual display system having increased vertical field of view (FOV) is described. The system includes a projector system for projecting an image beam, a collimating mirror, and a backscreen interposed between the projector system and the mirror for redirecting the image beam onto a surface of the collimating mirror. The collimating mirror in turn redirects the image beam to the observer eye point. The projector system and backscreen are mechanically integrated together to form an integrated assembly and mounted to a hinge point for rotation about the hinge point. The collimating mirror being oversized relative to the size of the beam to accommodate changes in position of the redirected beam from the backscreen so that the redirected beam will reach the mirror surface throughout a range of rotation of the integrated assembly. An actuator system is coupled to the integrated assembly for rotating the assembly about the hinge point in response to rotation control system. Increased vertical field of view is achieved by the capability of rotating the projector and backscreen.

In a first alternate system in accordance with another aspect of the invention, only the projector is rotatable about the hinge point, with the backscreen fixed in position.

In a second alternate system in accordance with a further aspect of the invention, the projector is positioned to cover the entire vertical FOV and mechanically fixed in position. Instead of rotating the projector, this embodiment emulates the rotation by electronically slewing the raster on the projector to cover the instantaneous vertical FOV.

BRIEF DESCRIPTION OF THE DRAWING

These and other features and advantages of the present invention will become more apparent from the following detailed description of an exemplary embodiment thereof, as illustrated in the accompanying drawings, in which:

FIG. 4 is a schematic diagram of the rotating projector system with the projector in the conventional lower position. FIG. 5 is a schematic diagram of the system with the projector rotated to the upper position.

FIG. 6 shows the system with the projector system's raster in the down position. FIG. 7 shows the system with the projector system's raster in the upper position, having been positioned there electronically. FIG. 8 is a schematic block diagram illustrating the operation of the display system of FIGS. 6 and 7. FIG. 9 is a simplified front view of the CRT face, showing the CRT image in the upper position. FIG. 10 is a simplified front view of the CRT, showing the CRT image in the lower position.

DETAILED DESCRIPTION OF THE PREFERRED EMBODIMENTS

In accordance with one aspect of the invention, the backscreen assembly, projectors and projector support platform of an OABD system are mechanically integrated together and mounted to a hinge point and actuator system that allows them to be rotated vertically relative to a large collimating mirror. This range of movement provides increased vertical FOV for the system.

Figure 2:
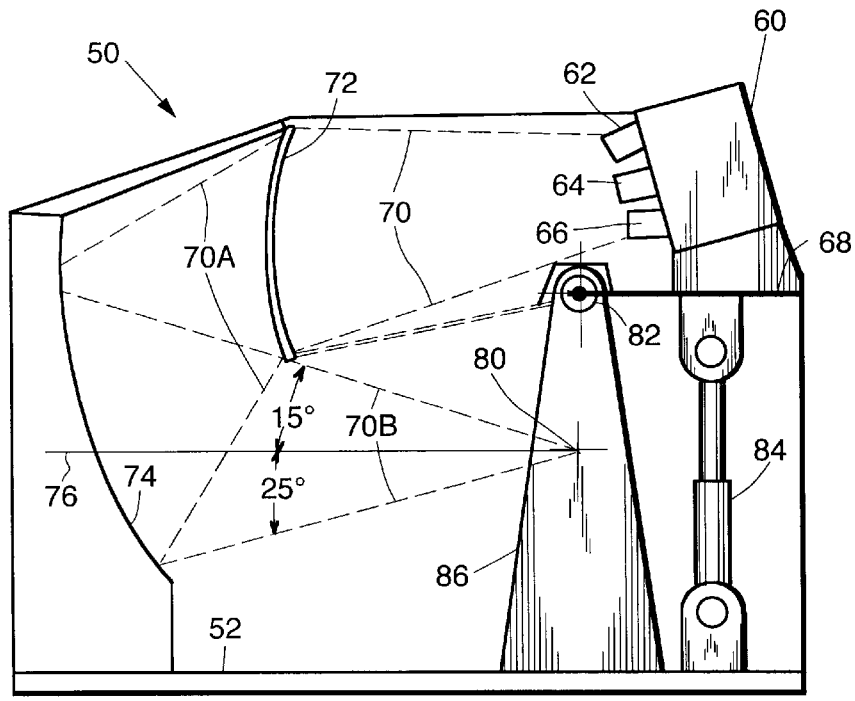
FIG. 2 is a schematic diagram of an OABD system embodying the invention, with the backscreen and projector system in the conventional lower position.
Figure 3:
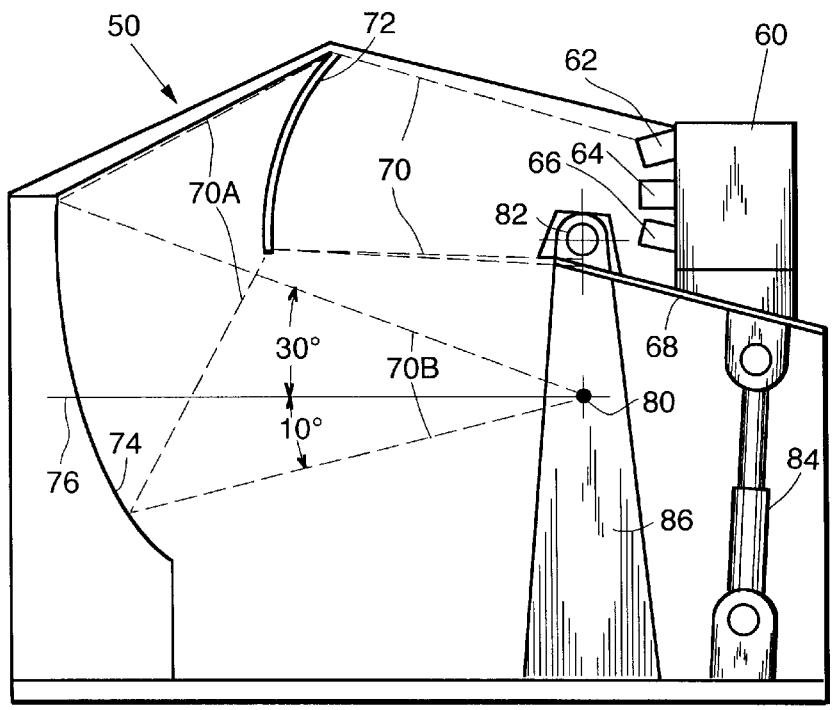
FIG. 3 is a schematic diagram of the OABD system of FIG. 2, with the backscreen and projector system rotated to the upper position, having been positioned there by an actuator and hinge pivot system.

FIGS. 2 and 3 are schematic diagrams illustrating an OABD system embodying this aspect of the invention. FIG. 2 is a schematic diagram of an OABD system embodying the invention, with the backscreen and projector system in the conventional lower position. FIG. 3 is a schematic diagram of the OABD system of FIG. 2, with the backscreen and projector system rotated to the upper position, having been positioned there by an actuator and hinge pivot system 84.

The OABD system 50 includes a projector system 60 with red, green and blue image projectors 62, 64 and 66. The projector system is mounted on a projector platform 68 mounted above the simulator floor 52. The projector system projects an image beam 70 onto a backscreen assembly 72 which redirects the image beam as beam 70A onto the collimating mirror 74. The backscreen assembly provides the surface on which light from the projector is focused from the screen's backside. This is a rear screen projector, employing a rear screen projection material, well known in the art. Due to the nature of this screen material, the image is actually reproduced on the opposite (front) side of the screen. The shape and location of the screen with respect to the mirror causes that image to appear collimated when viewed off the collimating mirror 74. The mirror 74 redirects the beam as beam 70B to the observer's eye point 80. While the collimation mirror will have the same radius as a counterpart mirror in a conventional system, the mirror 74 will be taller to accommodate the increased vertical FOV.

In accordance with the invention, the backscreen 72, projection system 60 and the projector support platform 68 are mechanically integrated together and mounted to a hinge pivot support structure 86 that allows the backscreen 72, the projection system 60 and the projector support platform 68 to rotate vertically about the hinge pivot axis 82. The actuator system 84 is an electrically or hydraulically powered actuator that extends or retracts to rotate the backscreen 72, projection system 60 and the projector support platform 68 to rotate vertically about the hinge pivot axis 82. The hinge axis 82 is coincident with, or in the vicinity of, the center of curvature of the backscreen 72, and is generally oriented parallel to the horizontal.

Line 76 is a reference horizontal line intersecting the eye point 80. As illustrated, with the backscreen and projector system rotated to the lower position shown in FIG. 2 by the actuator system, the FOV at the eye point is about 15 degrees above the horizontal and 25 degrees below the horizontal, thus aggregating about 40 degrees.

FIG. 3 shows the backscreen 72, projector 60 and platform 68 rotated about the hinge point to an upper rotated position relative to the mirror 74. In this position, the beam 70A from the backscreen is raised relative to its position when the rotated elements are lowered to the lower position. Now the FOV of the system extends from about 30 degrees above the horizontal line 76 to about 10 degrees below the horizontal. Thus the vertical FOV of the system has been increased by the capability of rotation of the backscreen and projector system.

In an exemplary application, the lower backscreen and projector position depicted in FIG. 2 may be appropriate for simulations of take-off and landing operations, since most of the important scene information, the runway in particular, is normally located close to or below the horizontal. The raised position depicted in FIG. 3 is more appropriate for simulations of aerial refueling receiver aircraft operations, where the tanker aircraft is normally located well above the horizontal. This invention enables one visual system to fill both roles without compromising the FOV of one for the other. The transition from one position to the other can occur smoothly with uninterrupted operations, say as in this example during the period the receiver aircraft rendezvous with the tanker after take-off. The desired position can also be established prior to the beginning of one or the other operations without concern about the transition.

Figure 4:
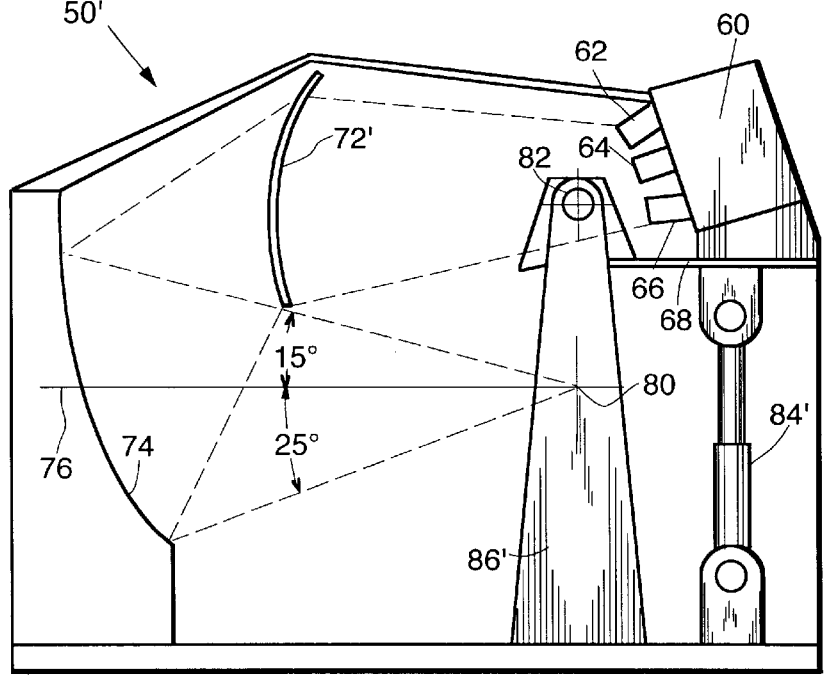
FIGS. 4 and 5 illustrate an alternate embodiment of a rotating projector system embodying another aspect of the invention, wherein the backscreen is fixed in position.
Figure 5:
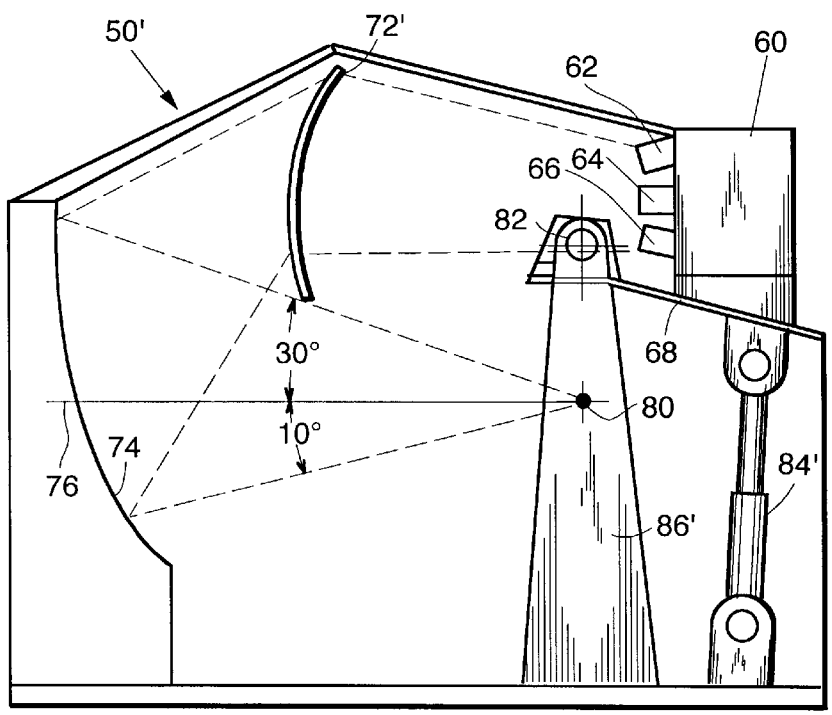

In accordance with another aspect of the invention, a rotating projector system is described, which provides a technique for economically increasing the resolution of an OABD while maintaining its total vertical FOV in such systems where a smaller instantaneous vertical FOV is adequate but the resolution is not. With a system in accordance with this aspect of the invention, only the projector and projector support platform are mechanically integrated together and mounted to hinge points that allow them to be rotated vertically relative to the large collimating mirror and backscreen. FIGS. 4 and 5 illustrate a rotating projector system 50' embodying this aspect of the invention. In this embodiment, the backscreen 72' is fixed in position. The projector platform 68 is mounted on hinge pivot support structure 86' for rotation about a pivot axis 82, located at or in the vicinity of the center of curvature of the backscreen 72', and oriented in parallel to the horizontal. The actuator system 84' extends or retracts to rotate the projection system 60 and projector platform 68 vertically about the pivot axis 82.

FIG. 4 illustrates the projector platform 68 in the conventional down position. As in the system 50 of FIGS. 2–3, the FOV at the eye point extends from about 15 degrees above the horizontal (76) to about 25 degrees below the horizontal in this exemplary embodiment. FIG. 5 illustrates the platform 68 is the upper position, having been positioned there by actuator and hinge pivot system 84'. With the platform 68 in the upper position, the FOV at the observer point 80 extends from about 30 degrees above the horizontal to about 10 degrees below the horizontal in this example.

OABD systems are typically configured with more than one color projector system, such that each projector system covers only a portion of the OABD's total horizontal FOV. In general, the larger the horizontal FOV, the greater the number of projectors. Only one of the projector systems comprising the system 50' may be configured for rotation, thus enabling increased resolution in just the forward FOV where it may be needed for a particular application, or all of the projector systems may be configured for rotation. The conventional system, with its fixed projector systems, to cover the total FOV of the rotated projector system 50', would have to instantaneously spread the resolution capabilities of its projector system and image generator system across the total FOV covered by the rotated projector system 50' as it travels from one of its limits of rotation to the other. The rotated projector system 50' needs only to spread its resolution capabilities over a smaller instantaneous FOV since it can be rotated to cover the needed FOV. For the exemplary embodiment illustrated in FIGS. 4 and 5, the rotated projector's instantaneous FOV is 40°, i.e. +15° to −25° in the position of FIG. 4 and +15° to −10° in the position of FIG. 5. In order for a conventional, fixed projector system to cover the same total FOV, it would have to have an instantaneous coverage of 50°, i.e. +25° to −25°, spreading its resolution capabilities over a larger area.

According to a further aspect of the invention, a virtual rotating projector system 50" provides an even more economical method of increasing the resolution of an OABD while maintaining its total vertical FOV in such systems where a smaller instantaneous vertical FOV is adequate but resolution is not. With this system the projector is positioned to cover the total vertical FOV and mechanically fixed in position. Instead of rotating the projector 60 as in the embodiments of FIGS. 2–5, a system in accordance with this aspect of the invention emulates the rotation by electronically slewing the raster on the projector cathode ray tube displays to cover the required instantaneous vertical FOV.

Figure 6:
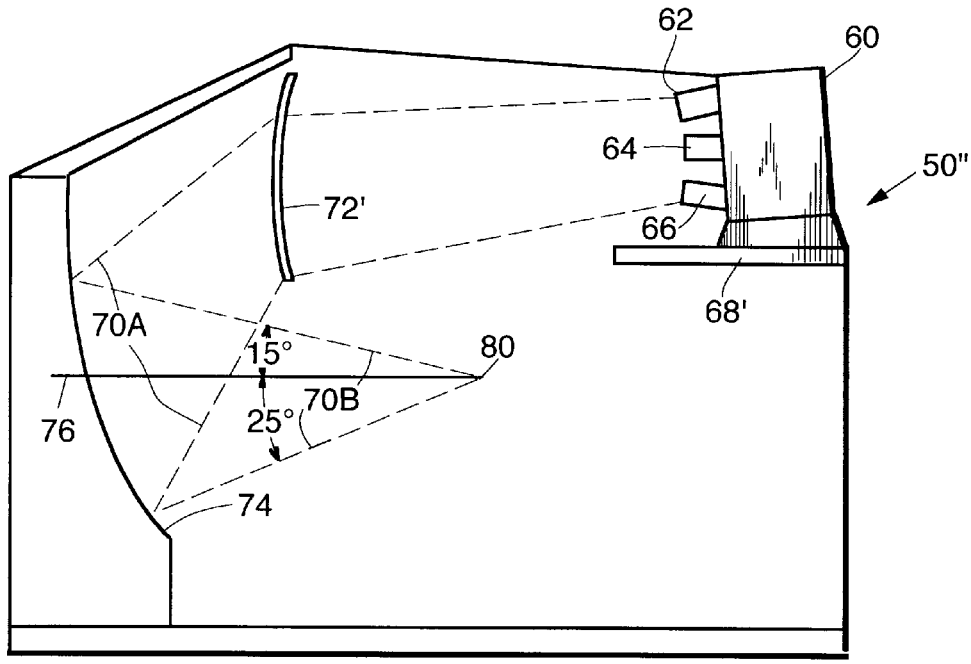
Figure 7:
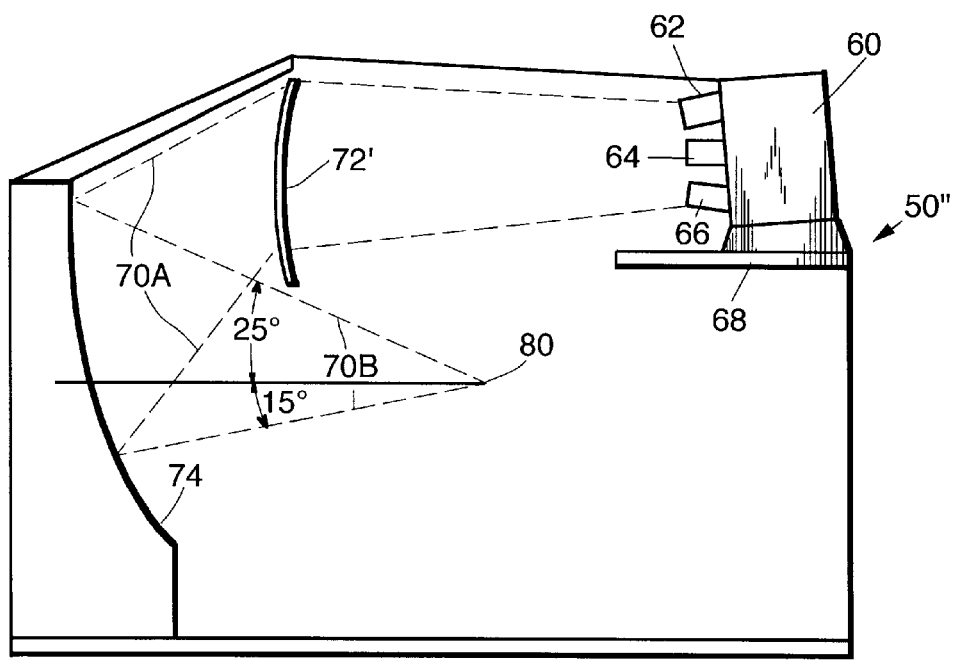

This aspect of the invention is shown in FIGS. 6–10. FIG. 6 shows the virtual off axis visual system with the projector system's raster in the standard down position. Here the FOV at the observer point 80 extends from about 15 degrees above the horizontal (76) to about 25 degrees below the horizontal in this example. FIG. 7 shows the system with the projector systems' raster in the upper position, having been positioned there electronically. Now the system has a FOV at the observer's point which extends from about 25 degrees above the horizontal in this embodiment to about 15 degrees below the horizontal. In this embodiment, neither the projector 60' nor the backscreen 72' are movable.

Figure 1:
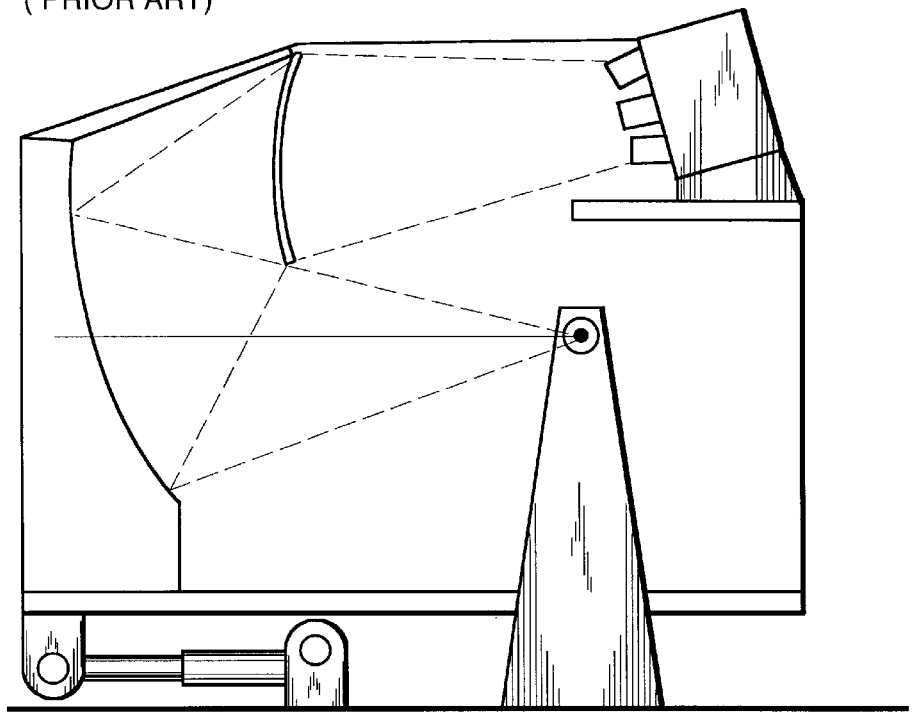
FIG. 1 shows a system used in the past few years whereby the entire display system is rotated about the observer eyepoint.
Figure 8:
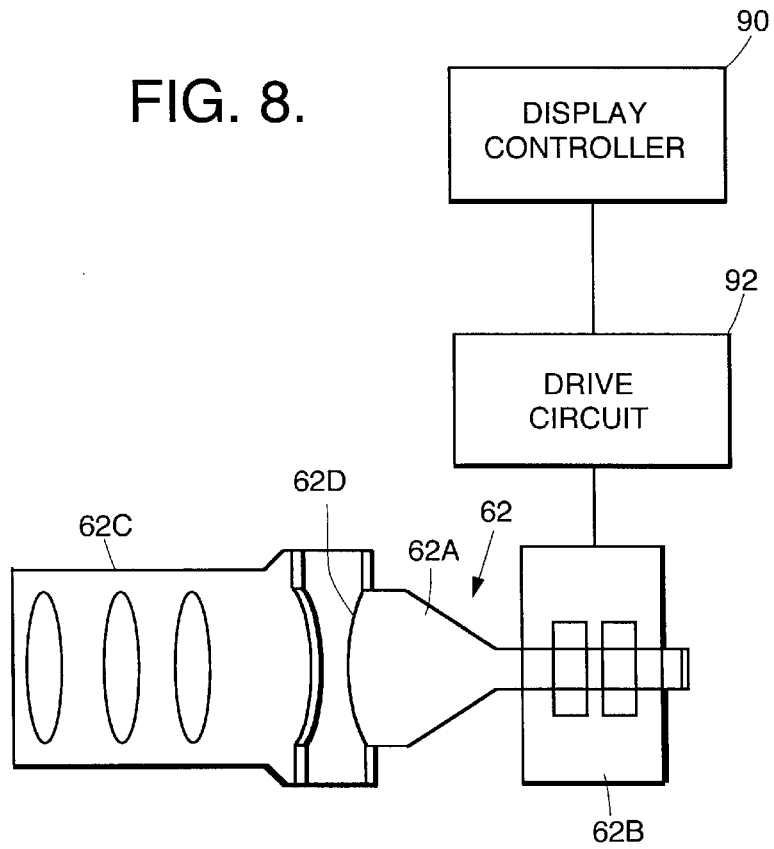
FIGS. 6–10 illustrate a further alternate embodiment of the invention, wherein the rotation of the projector system is emulated by slewing the raster of the projector CRTs to achieve the required vertical FOV.
Figure 9:
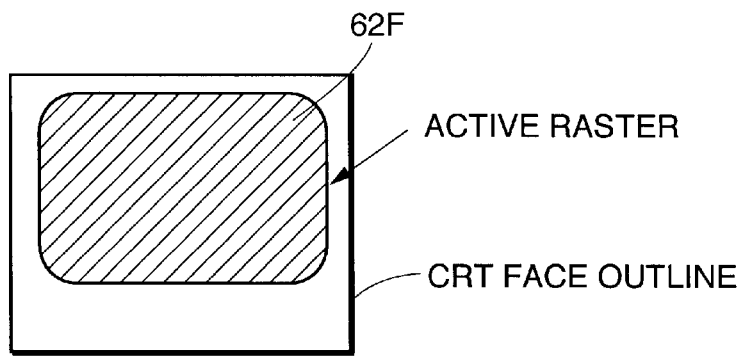
Figure 10:
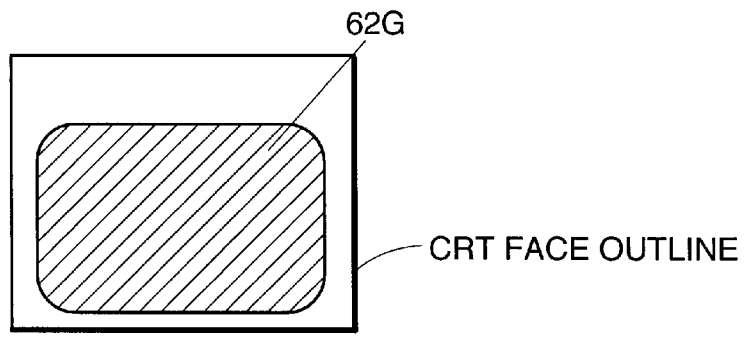

FIG. 8 is a schematic block diagram illustrating the operation of the virtual off-axis display system of FIGS. 5 and 6. An exemplary one 62 of the projectors 62, 64, 66 is shown in FIG. 8; the image for the other projectors 64, 66 will also be electronically repositioned in the same manner as described below. The projector includes a CRT 62A with a CRT face 62D for generating thereon the CRT image. A set 62B of drive coils is driven by the display controller 90 and drive circuit 92 to generate the CRT raster. A lens arrangement 62C focuses the image generated by the CRT. The display controller 90 generates raster control signals to position the active portion of the raster display on the appropriate part of the CRT face. For example, assume the CRT has 256 scanned raster lines. Lines 1–150 can be actively drawn, with lower lines 151–256 blanked, to produce an active area 62F. FIG. 9 shows the image generated within the active area 62F which is in the upper portion of the CRT face. This is for generating the up FOV position. FIG. 10 shows the CRT being controlled by the display controller 90 to position the active portion 62G in the lower portion of the display active region for the down FOV position. Now lines 1–100 are blanked, and lines 101–256 are actively drawn, producing the active area 62G.

Like a conventional system with fixed projectors, the resolution capability of the virtual rotating projector system 50" is spread across the total FOV, e.g. 50° in the embodiment of FIGS. 5 and 6. However, unlike the conventional system, the resolution capability of the image generator for the virtual rotating projector system 50" need only be spread over the instantaneous FOV, e.g. 40° as shown in FIGS. 6 and 7.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An off-axis backscreen visual display system having increased vertical field of view (FOV), comprising:

a projector system for projecting an image;

a collimating mirror;

a backscreen interposed between the projector system and the mirror for redirecting the image onto a surface of the collimating mirror, the collimating mirror in turn redirecting the image to an observer eye point;

the projector system and backscreen being mechanically integrated together to form an integrated assembly and mounted for rotation about a hinge axis;

the collimating mirror being oversized relative to the size of the image to accommodate vertical changes in position of the redirected image from the backscreen so that the redirected image will reach the mirror surface throughout a range of rotation of the integrated assembly;

an actuator system coupled to the integrated assembly for rotating the assembly about the hinge axis.

2. The system of claim 1, wherein the hinge axis is generally horizontal.

3. The system of claim 1, wherein the projector system is mounted on a projector platform for mechanical integration with the backscreen.

4. The system of claim 1, wherein the projector system includes red, green and blue image projectors.

5. The system of claim 1, wherein the hinge axis passes through a center of curvature of said collimating mirror.

6. An off-axis backscreen visual display system having increased vertical field of view (FOV), comprising:

a projector system for projecting an image;

a collimating mirror;

a backscreen interposed between the projector system and the mirror for redirecting the image onto a surface of the collimating mirror, the collimating mirror in turn redirecting the image to an observer eye point;

the projector system mounted to a hinge axis for rotation about the hinge axis, the hinge axis intersecting a center of curvature of the backscreen, the backscreen being fixed in position;

the collimating mirror being vertically oversized relative to the vertical size of the image to accommodate changes in vertical position of the redirected image from the backscreen so that the redirected image will reach the mirror surface throughout a range of rotation of the projector system;

an actuator system coupled to the projector system for rotating the projector assembly about the hinge axis.

7. The system of claim 6 wherein the hinge axis is generally horizontal.

8. The system of claim 6 wherein the projector system is mounted on a projector platform for rotation about the hinge axis.

9. The system of claim 6 wherein the projector system includes red, green and blue image projectors.

10. An off-axis backscreen visual display having increased vertical field of view (FOV), comprising:

a projector system for projecting an image;

a collimating mirror;

a backscreen interposed between the projector system and the mirror for redirecting the image onto a surface of the collimating mirror, the collimating mirror in turn redirecting the image to an observer eye point;

the collimating mirror being oversized relative to the size of the image to accommodate vertical changes in position of the image from the backscreen so that the image will reach the mirror surface throughout a range of positions of the image generated by the projector assembly;

apparatus for electronically repositioning the image generated by the projector system, said apparatus comprising an image controller for generating imagery in a first active area of said projector and for generating imagery in a second active area of said projector.

11. The system of claim 10 wherein the projector system includes red, green and blue image projectors.

12. The system of claim 10 wherein said projector system includes a cathode ray tube (CRT) display device, and wherein said image controller controls a drive circuit for the CRT device.

13. The system of claim 12 wherein said CRT device is a raster device, wherein a first set of raster lines are active to produce the first active area, and wherein a second set of raster lines are active to produce the second active area.

14. The system of claim 10 wherein the first active area is in a lower area, and the second active area is in an upper area, to thereby provide capability of increasing vertical field of view of the display device electronically.

15. The system of claim 10 wherein the projector system and backscreen are fixed in position.

16. An off-axis backscreen visual display system having increased vertical field of view (FOV), comprising:

a projector system for projecting an image;

a collimating mirror;

a backscreen interposed between the projector system and the mirror for redirecting the image onto a surface of the collimating mirror, the collimating mirror in turn redirecting the image to an observer eye point;

the collimating mirror being vertically oversized relative to the size of the image to accommodate vertical changes in position of the redirected image from the backscreen so that the redirected image will reach the mirror surface throughout different vertical positions of the redirected image relative to the collimating mirror;

apparatus for vertically repositioning the image generated by the projector system to cause said redirected image to assume said different positions relative to the collimating mirror, including rotating apparatus for rotating said projector system about a hinge axis, the hinge axis passing through a center of curvature of said backscreen.

17. The system of claim 16 wherein the projector system includes red, green and blue image projectors.

18. The system of claim 16 wherein said rotating apparatus comprises a mechanical apparatus for rotating said projector system about the hinge axis while the backscreen and collimating mirror remain in respective stationary positions.

* * * * *